INVENTOR.
Robert C. Main.
BY Albert J. Henderson
HIS ATTORNEY

Patented Oct. 21, 1952

2,614,621

UNITED STATES PATENT OFFICE 2,614,621

SAFETY CONTROL SYSTEM FOR ELECTRICALLY OPERATED HEATING MEANS

Robert C. Main, Los Angeles, Calif., assignor to Robertshaw-Fulton Controls Company, a corporation of Delaware Application September 8, 1947, Serial No. 772,754

13 Claims. (Cl. 158—124)

1

This invention relates to control systems for electrically operated devices such as solenoid fuel valves embodied in heating apparatus and, more particularly, to combined temperature, safety and ignition systems of the electrical type for use in connection with gaseous fuel burners.

A system having the indicated features may conveniently be arranged with a single solenoid valve for both temperature and safety control for the fuel burner. The solenoid valve is energized from a source of current supply at line voltage. In such installations, however, the temperature control device, such as the room thermostat in space heating applications, is not advantageously arranged if it is also required to operate at line voltage. Special transformers and low voltage solenoid valves have been used in conjunction with such temperature control devices in order to avoid this difficulty. Such added equipment detracts from the desired simplicity of the basic circuit and necessarily involves additional expense in initial cost and upkeep.

An object of this invention is to control a fuel burning apparatus safely and in accordance with desired temperature conditions by the use of a single fuel controlling device.

Another object of the invention is to utilize either a conventional room thermostat or a temperature sensitive resistor as an ambient temperature control device.

Another object of the invention is to render the ambient temperature control feature subject to the establishment and continuance of safe flame conditions at the burner.

Another object of the invention is to control a variety of heating apparatus by simple relocation of the control parts and without extensive modification of the control elements.

Figure 1:
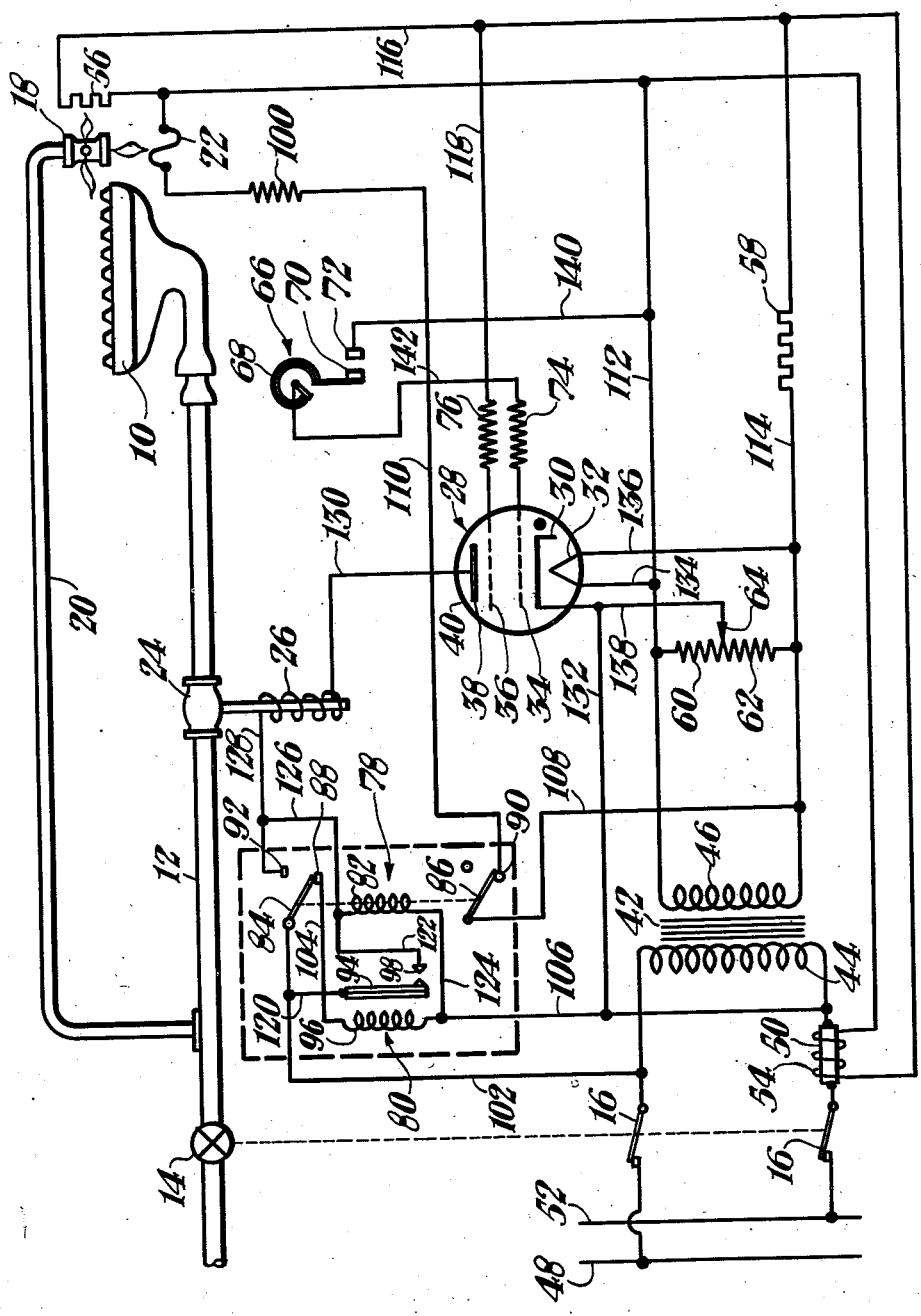
Figure 2:
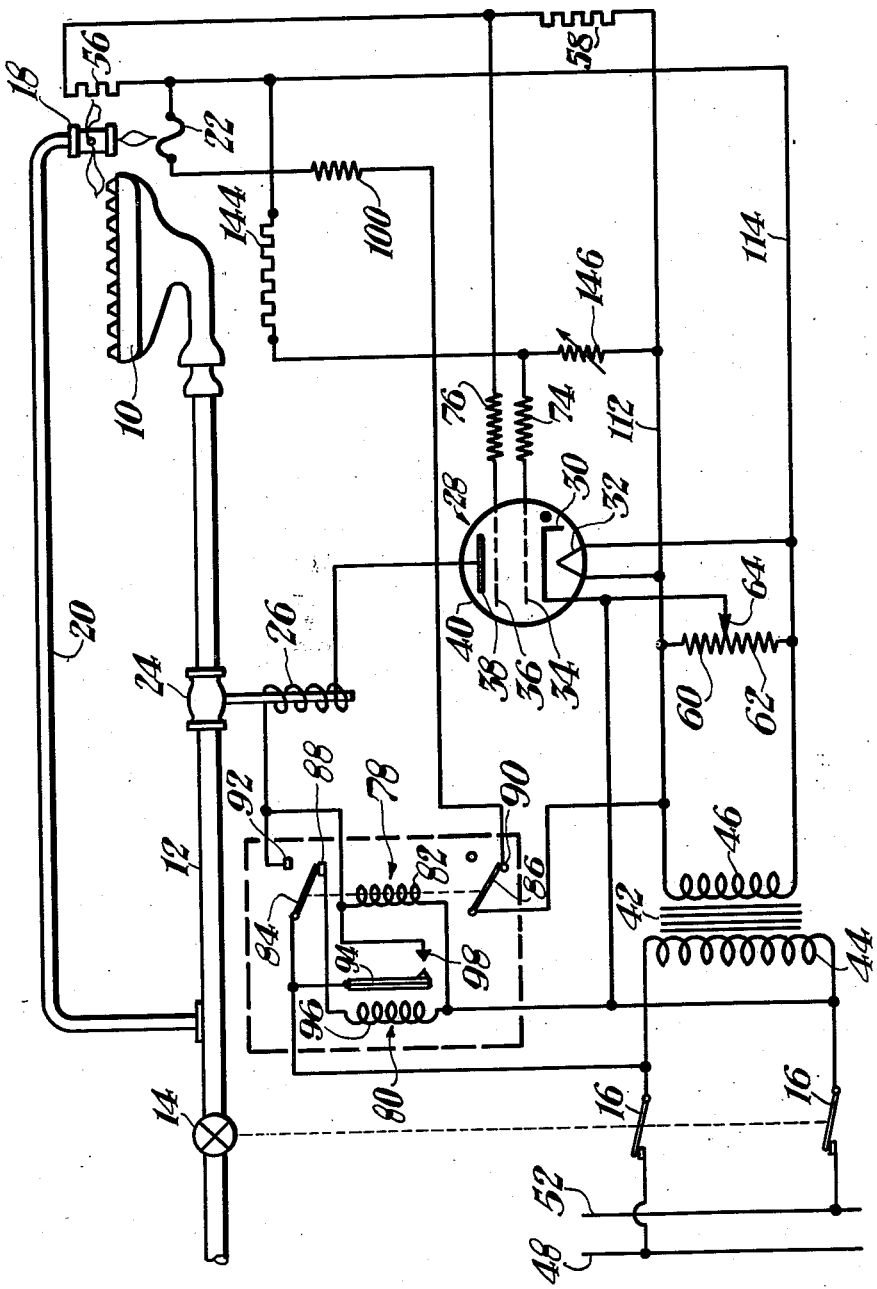

Other objects and advantages will become apparent from the following description taken in connection with the accompanying drawings, wherein:

Fig. 1 is a schematic view of the improved control system for controlling the flow of fuel to a fuel burning apparatus safely and in accordance with desired temperature conditions; and Fig. 2 is a similar schematic view of a modification of the improved control system.

Referring more particularly to Fig. 1 of the drawings, the main burner 10 is shown as being supplied with fuel from a main fuel pipe 12 under control of the main fuel valve cock 14 which includes a double-break main switch 16 adapted to be operated to closed position when the cock 14 is opened and to be normally opened when the cock 14 is closed. A pilot burner 18 is located in proximity of the main burner 10 to ignite the fuel flowing therefrom and is sup-

2 plied with fuel by a conduit 20 under control of the main fuel cock 14. Electric igniting means 22, preferably in the form of a coil of resistance wire is located in lighting proximity to the pilot burner 18 to ignite the fuel issuing therefrom.

Electrically operable means is provided for controlling the flow of fuel to the main burner 10 and may take the form of an electromagnetic valve 24 normally biased to closed position by gravity, spring means or the like to prevent the supply of fuel to the main burner 10. The valve 24 has a solenoid energizing coil 26 operatively associated therewith for causing it to open when energy of sufficient value is supplied to the coil 26. As will be apparent, the supply of fuel to the main burner 10 is under control of both the main fuel cock 14 and the valve 24 while the supply of fuel to the pilot burner 18 is under control of the main fuel cock 14 only. The valve 24 forms the single control device of this invention for providing both safety and temperature control of the main burner 10.

In order to secure this desired dual form of control an electronic control circuit is utilized. An electron discharge device 28 of the thyratron type is provided for controlling operation of the valve 24 in conjunction with means to be described hereinafter. The cathode 30 of the electron device 28 is indirectly heated by a heating filament 32 and these elements are housed together with a control grid 34, shield grid 36 and anode 38 within the usual gas-filled envelope 40. As is customary in such devices, the control grid 34 is located in proximity of the cathode 30 while the shield grid 36 is located between the control grid 34 and the anode 38.

A step-down transformer 42 is included in the system and comprises a line voltage primary 44 and a secondary 46. The primary 44 is connected at one end through one pole of the switch 16 to a line wire 48. The opposite end of the primary 44 is connected to one terminal of the opposite pole of switch 16 through the terminals of a thermal cutout 50 and the opposite terminal of this pole of switch 16 is connected to a line wire 52. While any suitable voltage may be employed depending on the voltage of the power source available and the operating characteristics of the electron device 28 and the valve 24, the primary winding 44 in this instance is connected to a 115-volt source of alternating current and the secondary 46 is designed to operate at approximately six volts.

The thermal cutout 50 is provided with a heater 54 in the form of a coil of wire of suitable resistance characteristics. Thus, the cutout 50 is capable of opening the circuit of the primary 44 upon passage of overcurrent therethrough due to its series connection in this circuit. Moreover, the cutout 50 is also capable of opening the circuit of the primary 44 whenever the heater 54 becomes sufficiently heated by passage of current therethrough beyond a predetermined value.

A heat responsive resistance means is located in proximity of the heating means to be heated by radiation therefrom. Specifically, the heat responsive means takes the form of a resistor 56 having normally a relatively low resistance and a positive temperature coefficient of resistance. The resistor 56 is exposed to the flame of the pilot burner 18 and is adapted to vary in resistance value when heated thereby. The resistor 56 forms one of a pair of resistors, the other of which is designated 58 and need have no special thermal resistance characteristics. An additional resistance means is arranged in the form of two resistor sections 60, 62 defined by a tap 64. As will hereinafter be apparent, the two pairs of resistors 56, 58 and 60, 62 each form potential dividers across the voltage source for different purposes connected with the control of the operation of the electron discharge device 28.

Further means for controlling the operation of the electron discharge device 28 include, in the embodiment shown in Fig. 1, a thermally responsive means or thermostatic switching means in the form of a conventional room thermostat 66 which is located in a space to be heated by the heating means and is thus responsive to temperatures ambient thereto. The thermostat 66 comprises the usual bimetallic coil or arm 68 carrying a movable contact 70 for cooperation with a relatively fixed contact 72. The bimetallic arm 68 is connected through a resistor 74 to the control grid 34. Another resistor 76 is included in the connection from the shield grid 36 to the resistors 56, 58.

Time delay mechanism including a relay 78 and a timing device 80 forms part of the control system. The relay 78 includes a coil 82 and a pair of spaced armature means 84, 86 operable thereby. The armature means 84, 86 are designed to cooperate with a pair of fixed contacts 88, 90, respectively, when the coil 82 is effectively deenergized. Upon energization of the coil 82, the armature means 84 is designed to cooperate with a fixed contact 92 while the armature means 86 merely ceases to cooperate with the contact 90. The timing device 80 includes a bimetallic strip 94 having a heater 96 in the form of a coil of wire associated in heating proximity therewith. The bimetal strip 94 is adapted to warp when heated by the heater 96 and cooperate with a fixed contact 98.

The various elements of the system thus described are completed by the provision of a resistor 100 for limiting the value of the current supplied to the igniting means 22. It will be apparent that the voltages and resistance values of the system will be arranged to provide the combination most favorable to contact life and safety in wiring. In the subsequent description of the operation of the system the various circuit connections for the described elements will be outlined together with the cooperation between the various elements to produce the desired result.

With the various elements in the positions shown in Fig. 1 of the drawings, and the system inoperative, the fuel supply and 115-volt electric supply to the primary 44 of the transformer 42 are turned on simultaneously by operation of the main fuel valve 14. Thus, fuel will flow in the conduit 20 to the pilot burner 18 and the transformer 42 will simultaneously be energized. The current flows from the primary 44 to the heater 96 of the timing device 80 through the following circuit: upper terminal of primary 44, wire 102, armature 84, contact 88, wire 104, coil 96, and wire 106 to the lower terminal of the primary 44. Meanwhile, the secondary 46 is energized and a portion of the transformer output is utilized to energize the igniting means 22 as follows: lower terminal of secondary 46, wire 108, armature 86, contact 90, wire 110, resistor 100, igniting means 22 and wire 112 back to the upper terminal of transformer secondary 46.

Upon the igniting means 22 reaching igniting temperature the fuel issuing from the pilot burner 18 is lighted thereby but, due to the valve 24 being still closed, there is no flame produced at the main burner 10. However, the thermal resistor 56 is heated by the pilot burner flame and cooperates with the resistor 58 to establish the bias for the shield grid 36 of the electron discharge device 28. The resistors 56, 58 are connected in series circuit across the secondary 46 in the following circuit: lower terminal of secondary 46, wire 114, resistor 58, wire 116, resistor 56 and wire 112 back to the upper terminal of transformer secondary 46. The resistors 58 and 56 also have a common connection to the shield grid 36 by resistor 76 and wire 118 connected to wire 116.

Upon expiration of a few seconds from the initial production of a flame at the pilot burner, the heater coil 96 heats the bimetal strip 94 sufficiently to cause it to warp and engage the contact 98. The relay coil 82 is then energized through the following circuit: upper terminal of primary 44, wire 102, wire 120, bimetal 94, contact 98, wire 122, coil 82, wire 124 and wire 106 back to the lower terminal of the primary 44. The armature means 84, 86, now move to their attracted positions; armature means 84 moves into engagement with contact 92 while armature means 86 becomes disengaged from contact 90. As the armature means 86 and contact 90 control the described circuit to the igniting means 22, the latter now becomes deenergized. Moreover, the circuit to the heater coil 96 is also deenergized for a similar reason. Due to engagement of the armature means 84 with the contact 92 an additional circuit is established for the relay coil 82 and a circuit is established for the anode 38 of the electron discharge device 28.

The relay coil 82 now becomes energized through the following circuit: lower terminal of primary 44, wire 106, wire 124, coil 82, wire 126, wire 128, contact 92, armature means 84 and wire 102 to the upper terminal of primary 44. Thus, although the bimetal strip 94 cools and becomes disengaged from contact 98, the relay coil 82 remains energized through the described holding circuit. It will be apparent that in the attracted position of the armature means 84 the relay coil 82 remains energized from the primary side of the transformer 42 at approximately 115 volts. This voltage is also applied to the anode circuit of the electron discharge device 28 as follows: upper terminal of primary 44, wire 102, armature means 84, contact 92, wire 128, valve coil 26, wire 130, anode 38, cathode 30, wire 132 and wire 106 to the lower terminal of the primary 44.

The cathode 30 is heated by the filament 32 which is connected to the six-volt secondary 46 by a wire 134 from one end of the heating filament 32 to wire 112 and by a wire 136 from the opposite end of the filament 32 to the wire 114. Thus, if the electron discharge device 28 is conductive, the valve coil 26 will be energized through the described output circuit to open the valve 24 and admit fuel from the fuel pipe 12 to the burner 10 to be ignited by the pilot burner 18. However, the determination of whether the electron discharge device 28 will conduct or not depends on the bias on the control grid 34 and shield grid 36, as will now be apparent.

The cathode 30 is maintained at a fixed potential established by the position of the tap 64 relative to the resistors 60, 62, this tap being connected to the cathode 30 by wire 138. The resistors 60, 62 are connected across the filament supply voltage of transformer secondary 46 by connecting the free end of the resistor 60 to wire 112 and the free end of resistor 62 to wire 114. The bias voltage for the control grid 34 is provided by connecting this grid 34 through the resistor 74 and wire 142 to the bimetal arm of the thermostat 66 which has its stationary contact 72 connected by wire 140 to wire 112. The thermostat 66 is adapted to close its contacts 70, 72 upon a sufficient increase in temperature ambient thereto. As long as the contacts 70, 72 remain closed a voltage is supplied to the control grid 34 which is of opposite phase to the voltage supplied to the anode 38. The magnitude of this voltage is such that the negative bias on the control grid 34 prevents the electron discharge device 28 from becoming conductive and the valve 24 thereupon remains closed.

As soon as the contacts 70, 72 are opened due to the thermostat 66 calling for heat then the negative bias on the control grid 34 is sufficiently reduced to permit the tube to become conductive. It will be understood that the foregoing description of the function of the control grid 34 is contingent upon the thermal resistor 56 being heated by the pilot burner as previously described or, as will now be explained, no conduction by the electron discharge device 28 is possible for any expected value of bias voltage on the control grid 34.

Assuming that the thermostat 66 has its contacts 70, 72 open, then the determination whether the electron discharge device 28 is conductive depends upon the heated or unheated condition of the thermal resistor 56. When this resistor 56 is sufficiently heated by the pilot burner 18, then the bias voltage on the shield grid 36 is sufficiently reduced to permit the electron discharge device 28 to become conductive. Consequently, the output circuit of the electron discharge device 28 supplies sufficient energy to the coil 26 of the valve 24 to cause the latter to open and admit a continuous flow of fuel from the main fuel pipe 12 to the main burner 10 where it is ignited by the pilot burner 18.

Conversely, the determination of whether the electron discharge device is conductive depends upon whether the thermostat contacts 70, 72 are open or closed. When these contacts are closed, the voltage applied to the control grid 34 is sufficiently out-of-phase relative to that applied to the anode 30 that the device 28 is rendered non-conductive. Thus, there are two conditions to be fulfilled before the electron discharge device 28 conducts current to the solenoid valve 24. The resistor 56 must be sufficiently heated and the thermostat contacts 70, 72 must be open. The effect of either grid bias on the conductivity of the device 28 is dependent upon the other grid bias so that the two grid elements 34, 36 are effectively interlocked.

The energy so supplied to the coil 26 of valve 24 is half-wave or pulsating direct current due to the rectifying effect of the electronic device 28. In the event that the flame of the pilot burner 18 becomes extinguished, then the potential drop across the thermal resistor 56 is decreased as soon as this resistor starts to cool. The rate of decrease of this potential could be augmented by utilizing a thermal resistance element subject to the heating effect of current flow therethrough in place of the resistor 58. The bias of the shield grid 36 is finally changed in a negative direction so as to cause the output current of the electron discharge device 28 to decrease sufficiently to cause effective deenergization of the coil 26. The valve 24 thereupon closes to shut-off the fuel supply to the main burner 10. Since the main switch 16 must be opened in order to deenergize the circuit of the relay coil 82 and return the armature means 84, 86 to their initial position for ignition of the pilot burner 18, the system is not automatically recycling but requires manipulation of the main fuel cock 14 to begin a new cycle of operation.

During normal running operation of the system the pilot burner 18 continues to produce a flame. Control of the main burner 10 through the valve 24 is under control of the thermostat 66. As explained in the case of the thermal resistor 56 and shield grid 36, the contacts 70, 72 of the thermostat 66 are utilized to vary the bias of the control grid 34 so as to cause the output current of the electron discharge device 28 to vary accordingly and control the operation of the valve 24. Thus, when the ambient temperature to which the bimetal arm 68 is subject increases to a predetermined degree, then the contacts 70, 72 close. Consequently, an out-of-phase voltage obtained from the secondary 46 through the described circuit is applied to the control grid 34 and the electron discharge device 28 is rendered non-conductive. The valve 24 thereupon closes to shut-off flow of fuel to the main burner 10 until the thermostat again calls for heat whereupon the contacts 70, 72 open and the device 28 becomes conductive.

While the temperature of the thermal resistor 56 will vary over a small range with changes in the rate of fuel flow to the pilot burner 18 and due to changes in temperature conditions ambient to the resistor 56, these changes result in only a slight variation in the voltage of the shield grid 36 and it is apparent that serious fluctuations in the electron discharge device 28 will not result. Generally, the electron discharge device 28 is operated in a manner to make use of the two grids 36, 34 thereof for separate control purposes while the cathode 30 is maintained at a fixed potential. This manner of operating the electron discharge device 28 gives an extremely flexible type of control and in the embodiment shown and described herein permits the use of a thermostat for control of ambient temperatures while retaining desirable ignition and safety control features.

The embodiment disclosed in Fig. 2 of the drawings differs from that disclosed in Fig. 1 by utilizing a different type of temperature sensitive device in place of the control thermostat 66. The thermal cut-out 50 is not included in the embodiment of Fig. 2. Otherwise, the essential elements of the system are identical with those previously disclosed and further description is deemed unnecessary. Referring now more particularly to Fig. 2 of the drawings, the control grid 34 and its resistance element 74 have a common connection to a pair of resistors 144 and 146. The free end of resistor 144 is connected to the wire 114 and the free end of resistor 146 is connected to the wire 112 so that the pair of resistors constitute another voltage division network across the filament voltage supply of secondary 46. The resistor 144 is preferably formed from a semi-conductive material, such as a metallic oxide, having a negative temperature coefficient of resistance and is responsive to temperatures ambient thereto for varying in resistance value with variations in its temperature and is located in a space to be heated by the main burner 10.

The resistor 146 is in the form of a control rheostat of any known type and is manually adjustable over a range of resistivity settings corresponding to different temperature values at which it is desired that the temperature control will operate. It will be apparent that the resistor 144 could equally well have a positive coefficient of resistance and that in such event the relative positions of the resistors 144 and 146 would be interchanged from that shown in Fig. 2 of the drawings. In any event, the total resistance of the voltage division network thus formed is kept as high as possible to reduce any tendency toward self-heating from current flow to a minimum.

In the operation of the system illustrated in Fig. 2 of the drawings, the bias on the shield grid 36 will be reduced as described in connection with the Fig. 1 embodiment to such a value that the electron discharge device 28 will be rendered conductive only if the thermal resistor 56 is sufficiently heated by the flame at the pilot burner 18. The bias of the control grid 34 will permit the electron discharge device 28 to conduct when the temperature as sensed by the ambient temperature resistor 144 is below the setting established by the resistor 146. Thus, the thermal resistor 56 makes use of the shield grid 36 to permit this feature to override any heat demand established by the ambient temperature resistor 144.

It will be apparent that when the ambient temperature resistor 144 is below the control temperature, then the shield grid bias will permit conduction before the thermal resistor 56 is up to its maximum temperature and, conversely, that when the resistor 144 is at or near the control temperature a flame failure will result in a rapid shutoff time for the main burner 10. It will further be apparent that, as in the case of the Fig. 1 embodiment, no conduction by the electron discharge device 28 is possible for any value of resistivity of the resistor 144 whenever the thermal resistor 56 is unheated by the flame at the pilot burner 18. On the other hand, when the thermal resistor 56 is heated by the flame at the pilot burner 18, then a condition exists whereby changes in the ambient temperature as detected by the resistor 144 can either permit the electron discharge device 28 to conduct or not, as required.

It will be apparent that in both embodiments of the invention the ambient temperature control device makes use of extremely low voltages and has a very high resistance either inherently as in the case of the resistor 144 or by incorporation of the resistor 74. In the case of the control thermostat 66, this combination is most favorable to contact life. Moreover, the combination of low voltage and high resistance also provides the ultimate safety in wiring arrangements. Space heating applications normally require a transformer and low voltage solenoid valve in conjunction with the room thermostat. In the present system, the cost of both the transformer and the solenoid valve are contained in the cost of the system as a whole. Since the two items represent a substantial portion of the total sum, the expense of obtaining electronic ignition and safety features is materially reduced. It will be apparent that for space heating applications the control thermostat 66 in the Fig. 1 embodiment or the resistor 144 as shown in Fig. 2 could be used as the room thermostat or it could act as a stack or high temperature limit control. For this latter type of application a manual reset circuit breaker could be used to trip upon occurrence of over-temperatures or when a flame failure occurs. The device is also applicable to range ovens as well as space heating devices. In a range oven the rheostat 146 would act as the oven control and the resistor 144 would be placed in the oven chamber.

While a preferred embodiment of the invention and a modification thereof have been shown and described it is apparent that many other modifications will occur to those skilled in the art. Hence, the invention is not deemed to be limited to the forms shown and described or otherwise than as defined by the scope of the claims appended hereto.

I claim:

1. In a temperature controlling system, a control device having a coil and armature means operable to a controlling position upon energization of said coil, a timing device operable for controlling the energy supply to said coil and having a predetermined delay period during which said coil is effectively deenergized, contact means cooperable with said armature in said controlling position thereof for establishing a holding circuit for said coil independent of said timing device, a grid controlled electron discharge device having the output circuit thereof controlled by operation of said armature, means operable for producing a temperature condition, electrically operable means connected in said output circuit and operable for controlling the last said means for establishing said temperature condition, and biasing means adapted for normally applying a positive bias to said grid sufficient to render said device conductive, said biasing means including an element responsive to temperatures ambient thereto and located to respond to said temperature condition for lowering the potential of said grid upon an increase in said temperature sufficiently to render said electron discharge device effectively non-conductive.

2. The system claimed in claim 1 wherein said biasing means comprises a resistor and a thermostatic switch in series circuit with said grid, said switch being responsive to temperatures ambient thereto for closing said series circuit upon an increase in said temperature and being cooperable with said resistor for lowering the potential of said grid sufficiently to render said electron discharge device effectively non-conductive.

3. The system claimed in claim 1 wherein said biasing means comprises a pair of resistance means, one said resistance means being responsive to temperatures ambient thereto and the other said resistance means being adjustable for varying its resistance value, said pair of resistance means being cooperable for lowering the potential of said grid upon an increase in said temperature sufficiently to render said electron discharge device effectively non-conductive.

4. A temperature controlling system, comprising in combination, heating means to be controlled, electrically operable means for controlling said heating means, a source of electric energy, a control relay having a coil and armature means operable to a controlling position upon energization of said coil, a timing device having contacts connected in series circuit with said coil and said source and having a predetermined delay period during which said coil is effectively deenergized, contact means cooperable with said armature in said controlling position for establishing a holding circuit for said coil independent of said timing device, an electron discharge device having the output circuit thereof connected to said source and including said contact means, said armature means and said electrically operable means, and biasing means for the input circuit of said electron discharge device including an element responsive to temperatures ambient thereto caused by operation of said heating means for varying said bias in accordance with variations in said temperatures sufficiently to control the conductivity of said electron discharge device.

5. A temperature controlling system, comprising in combination, heating means to be controlled, electrically operable means for controlling said heating means, a source of electric energy, a grid-controlled electron discharge device having the output circuit thereof connected to said source and including said electrically operable means, potential divider means connected to said source and tapped to maintain said electron discharge device at a substantially fixed cathode potential, and a pair of resistance means in parallel circuit with said potential divider means, one of said pair of resistance means being responsive to temperatures ambient thereto caused by operation of said heating means and the other of said pair of said resistance means being adjustable for varying its resistance value, said pair of resistance means being tapped for lowering the potential of said grid upon an increase in said temperature sufficiently to render said electron discharge device effectively non-conductive.

6. A temperature controlling system, comprising in combination, heating means to be controlled, electrically operable means for controlling said heating means, a source of electric energy, a grid-controlled electron discharge device having the output circuit thereof connected to said source and including said electrically operable means, potential divider means connected to said source and tapped to maintain said electron discharge device at a substantially fixed and continuously energized cathode potential, and thermostatic switching means connected to said source and said grid and having contacts movable to closed position responsive to temperatures caused by operation of said heating means for applying out-of-phase voltage to said grid upon an increase in said temperature sufficiently to render said electron discharge device effectively non-conductive.

7. A temperature and safety control system for a heating means comprising electrically operable means for controlling said heating means, a source of electric energy, an electron discharge device having anode and cathode elements and a plurality of grids, connections between said source, said anode and cathode elements and said electrically operable means, heat responsive resistor means located in proximity of said heating means to be heated by radiation therefrom and being adapted to vary in resistance value with variations in temperature, connections between said source, said resistor and one of said grids for varying the potential of said one grid upon variations in said temperature sufficiently to vary the conductivity of said electron discharge device and cause operation of said electrically operable means, and thermally responsive means located in a space to be heated by said heating means and being connected to said source and another one of said grids, said thermally responsive means being cooperable with said resistor for varying said conductivity in accordance with variations in temperature caused by operation of said heating means.

8. A temperature and safety control system for a heating means comprising electrically operable means for controlling said heating means, a source of electric energy, an electron discharge device having anode and cathode elements and a plurality of grids, connections between said source, said anode and cathode elements and said electrically operable means, heat responsive resistor means located in proximity of said heating means to be heated by radiation therefrom and being adapted to vary in resistance value with variations in temperature, connections between said source, said resistor and one of said grids for varying the potential of said one grid upon variations in said temperature sufficiently to vary the conductivity of said electron discharge device and cause operation of said electrically operable means, and second heat responsive resistor means located relatively remote from said heating means and being adapted to vary in resistance value with variations in temperature, said second heat responsive resistor means being connected to said source and another one of said grids and being cooperable with the first said resistor means for varying said conductivity in accordance with variations in temperature caused by operation of said heating means.

9. A temperature and safety control system for a heating means comprising electrically operable means for controlling said heating means, a source of electric energy, an electron discharge device having anode and cathode elements and a plurality of grids, connections between said source, said anode and cathode elements and said electrically operable means, heat responsive resistor means located in proximity of said heating means to be heated by radiation therefrom and being adapted to vary in resistance value with variations in temperature, connections between said source, said resistor and one of said grids for varying the potential of said one grid upon variations in said temperature sufficiently to vary the conductivity of said electron discharge device and cause operation of said electrically operable means, and thermostatic switching means connected to said source and another one of said grids and being located relatively remote from said heating means but responsive to temperature changes caused by operation thereof, said switching means being operable for varying the conductivity of said electron discharge device while said heat responsive resistor means remains heated.

10. A temperature and safety control system for a heating means comprising electrically operable means for controlling said heating means, a source of electric energy, an electron discharge device having anode and cathode elements and a plurality of grids, connections between said source, said anode and cathode elements and said electrically operable means, a first pair of resistors connected across said source and having a common connection with one of said grids, one of said first pair of resistors being variable in resistivity with variations in temperature thereof and being located in proximity of said heating means to be heated by radiation therefrom, a second pair of resistors connected in parallel circuit with said first pair and having a common connection with another one of said grids, one of said second pair of resistors being variable in resistivity with variations in temperature thereof and being located relatively remote from said heating means but subject to temperature changes caused by operation of said heating means, said first pair of resistors being adapted upon heating of said one resistor of said first pair for varying the potential of said one grid sufficiently to render said electron discharge device effectively conductive, said second pair of resistors being adapted upon heating of said one resistor of said second pair to vary the conductivity of said electron discharge device while said one resistor of said first pair remains heated.

11. A temperature and safety control system for fuel burning apparatus having main and pilot burners and a source of electric energy, comprising electromagnetic valve means for controlling the supply of fuel to the main burner, a control relay having a coil and armature means operable thereby, a timing device having contacts controlling the energization of said coil for a predetermined period during which said coil is effectively deenergized, means operable in one position of said armature means for establishing a holding circuit for said coil independent of said timing device, an electron discharge device having anode and cathode elements and a plurality of grids, connections between said anode and cathode elements and said electromagnetic valve means controlled by operation of said armature means, heat responsive resistor means located to be heated by a flame at said pilot burner for varying in resistance value with variations in temperature and being connected across said source and to one of said grids, a second heat responsive resistor means located to respond to temperature conditions caused by operation of said main burner for varying in resistance value with variations in said conditions and being connected to another one of said grids and across said source in parallel circuit with the first said resistor means, and an electric igniter for said pilot burner connected across said source in parallel circuit with said first and second resistor means and controlled by operation of said armature means.

12. A temperature and safety control system for fuel burning apparatus having main and pilot burners and a source of electric energy, comprising electromagnetic valve means for controlling the supply of fuel to the main burner, a control relay having a coil and armature means operable thereby, a timing device having contacts controlling the energization of said coil for a predetermined period during which said coil is effectively deenergized, means operable in one position of said armature means for establishing a holding circuit for said coil independent of said timing device, an electron discharge device having anode and cathode elements and a plurality of grids, connections between said anode and cathode elements and said electromagnetic valve means controlled by operation of said armature means, heat responsive resistor means located to be heated by a flame at said pilot burner for varying in resistance value with variations in temperature and being connected across said source and to one of said grids, thermostatic switching means connected to said source and another one of said grids and being located to respond to temperature conditions caused by operation of said main burner for controlling the conductivity of said electron discharge device with variations in said conditions, and an electric igniter for said pilot burner connected across said source in parallel circuit with said resistor means and being controlled by operation of said armature means.

13. A temperature and safety control system for fuel burning apparatus having main and pilot burners and a source of electric energy, comprising electromagnetic valve means for controlling the supply of fuel to the main burner, a control relay having a coil and armature means operable thereby, a timing device having contacts controlling the energization of said coil for a predetermined period during which said coil is effectively deenergized, means operable in one position of said armature means for establishing a holding circuit for said coil independent of said timing device, an electron discharge device having anode and cathode elements and a pair of grids, connections between said anode and cathode elements and said electromagnetic valve means controlled by operation of said armature means, potential divider means connected across said source and tapped to said cathode for maintaining a substantially fixed potential, a pair of resistors in parallel circuit with said potential divider means, one said resistor being exposed to the flame of the pilot burner for varying in resistance value when heated thereby, said pair of resistors having common connection with one of said grids, thermally responsive means connected to said source and the other of said grids and located to respond to temperature conditions caused by operation of said main burner for applying out-of-phase voltage to said other grid upon an increase in said temperature and varying the conductivity of said electron discharge device while said one resistor remains heated, and an electric igniter for said pilot burner connected across said source in parallel circuit with said pair of resistors and being controlled by operation of said armature means.

ROBERT C. MAIN.

REFERENCES CITED

The following references are of record in the file of this patent:

UNITED STATES PATENTS

| Number | Name | Date |
|---|---|---|
| 1,893,223 | Burkle | Jan. 3, 1933 |
| 2,104,533 | Kramolin | Jan. 4, 1938 |
| 2,272,492 | Weyher | Feb. 10, 1942 |
| 2,274,384 | Scanlan | Feb. 24, 1942 |
| 2,324,330 | Smith | July 13, 1943 |
| 2,370,847 | Dempster | Mar. 6, 1945 |
| 2,404,643 | Livingston | July 23, 1946 |